United States Patent [19]

Wu

[11] 4,141,563

[45] Feb. 27, 1979

[54] POWER TRANSMISSION

[75] Inventor: David H. Wu, Warren, Mich.

[73] Assignee: Sperry Rand Corporation, Troy, Mich.

[21] Appl. No.: 645,668

[22] Filed: Dec. 31, 1975

Related U.S. Application Data

[63] Continuation of Ser. No. 442,725, Feb. 14, 1974, abandoned, which is a continuation-in-part of Ser. No. 313,712, Dec. 11, 1972, abandoned.

[51] Int. Cl.$^2$ .............................................. F16J 15/32
[52] U.S. Cl. .................................. 277/152; 277/164; 277/165; 277/235 R
[58] Field of Search ................... 277/1, 164, 165, 151, 277/153, 235, 158, 182, 183, 24

[56] References Cited

U.S. PATENT DOCUMENTS

| | | | |
|---|---|---|---|
| 1,969,797 | 8/1934 | Hubbard et al. | 277/183 |
| 2,866,670 | 12/1958 | Harris et al. | 277/165 |
| 2,992,027 | 7/1961 | Wright et al. | 277/153 |
| 3,572,734 | 3/1971 | Holt | 277/165 |
| 3,642,290 | 2/1972 | Millsap | 277/24 |
| 3,685,127 | 8/1972 | Potter | 277/153 |

*Primary Examiner*—Richard E. Aegerter
*Assistant Examiner*—L. Footland
*Attorney, Agent, or Firm*—Schovee & Boston

[57] ABSTRACT

A lip-type cartridge shaft seal has its toroidal body cavity filled with a silicone rubber adhesive sealant bonded to the main body of the seal. The silicone's adhesive properties and its lower hardness stabilize the body against collapse under intermittent or continuous high pressure forces without interfering with body flexibility.

14 Claims, 2 Drawing Figures

POWER TRANSMISSION

This is a continuation of application Ser. No. 442,725, filed Feb. 14, 1974, now abandoned, which is a continuation-in-part of application Ser. No. 313,712, filed Dec. 11, 1972, now abandoned for Power Transmission.

Lip-type seals for rotary or reciprocating shafts in a common configuration utilize a body of synthetic rubber supporting the lip which contacts the shaft. The body shape provides a tubular or conical flexing section between the shaft engaging part and the housing engaging part, and this allows for a considerable degree of shaft-run-out. Usually a garter spring surrounds the lip supporting portion of the body. Such shaft seals are widely used with great success in most sealing applications where the fluid within the housing is not exposed to high pessures. In certain applications there do arise conditions which expose the seal occasionally to either a steady or an intermittent pulsing high pressure sufficient to collapse the flexible tubular portion supporting the lip. Under these conditions, the seal rapidly deteriorates. One example of this phenomenon occurs with axial piston hydraulic pumps wherein the housing contains hydraulic fluid which is normally at a nominal low pressure. However, upon overloading or overspeeding, lifting of the cylinder barrel can occur intermittenly, permitting a high system operating pressure to reach the seal and collapse the lip.

Lip-type cartridge shaft seals are produced in great numbers and at low cost through quantity production methods, but due to their inability to withstand either intermittent or steady applications of high pressure, have been unsatisfactory for these applications which, up to now, have only been satisfactorily met by the use of much more expensive high pressure shaft seals.

Prior efforts to raise the pressure sealing capability of lip-type seals have included the addition of housing parts and of O-rings such as found in the patent to Dahlheimer U.S. Pat. No. 3,443,814. These have not, however, met the need for a low cost, high pressure lip-type seal. It has also been proposed to combine a hard, feather-edge type seal with an elastomeric filler to improve pressure performance, as seen for example, in Holt U.S. Pat. No. 3,572,734 (of record in the parent application to this one) and in Workman U.S. Pat. No. 3,447,731 but these improvements are mot appicable to lip-type seals.

It is an object of the present invention to provide an improved lip-type shaft seal utilizing the inexpensive configuration commonly available for ordinary low pressure purposes and with only a minor cost increase to provide satisfactory resistance to the application of high pressure forces throughout a long seal life.

Another object of the invention is to provide an improved method for preventing deterioration of a lip-type seal installed in the space between a shaft and a housing bore through which the shaft extends, due to exposure to high internal fluid pressure in the housing.

A further object is to provide an improved method for sealing the space between a shaft and a bore of a housing through which the shaft extends while the housing is subjected to high internal fluid pressure.

These objects are accomplished by the provision of a shaft seal comprising a body having a shaft engaging lip and a flexible first body portion extending from the lip axially outwardly, the body having additional portions which with the first portion enclose a generally toroidal space, and a ring of elastomeric material contained in the toroidal space and bonded to the body at least along the axially innermost extending sides of the toroidal space. The body preferably includes an elastomeric member and the elastomeric ring is preferably an adhesive sealant having a hardness materially less than that of the elastomeric part of the body.

Figure 1:
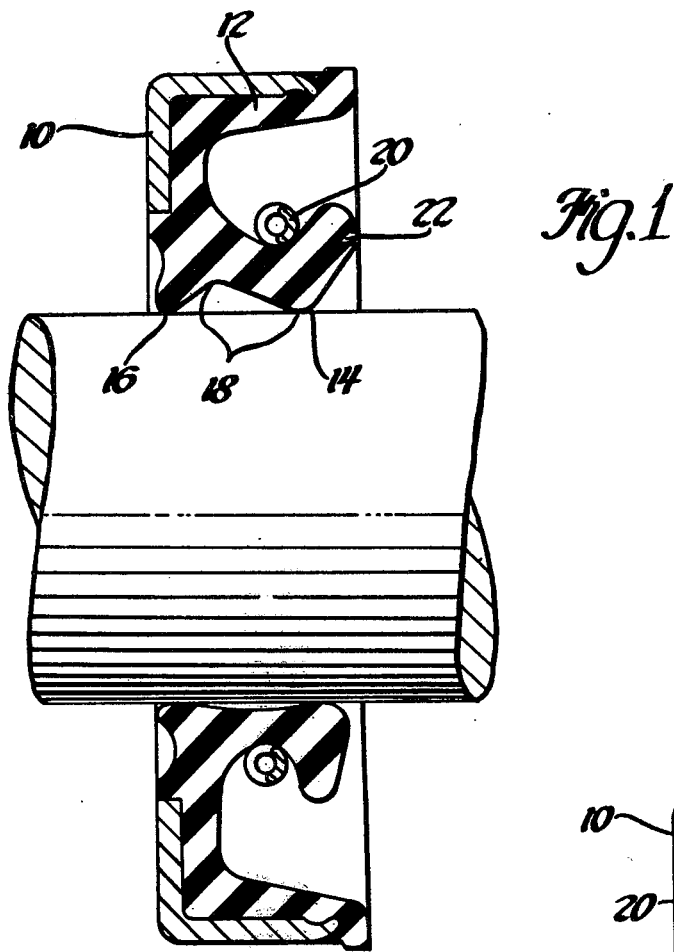
FIG. 1 is a cross sectional view of a shaft seal of conventional form showing its configuration under both low pressure and high pressure forces.

Referring now to FIG. 1 which shows a conventional cartridge type lip seal, the cartridge or body is composed of a pressed steel annulus 10 to which is bonded an element 12 of an elastomer such as Neoprene or Buna-N. The element 12 has formed on it a shaft engaging lip 14 for sealing the escape of fluid along the shaft from the right-hand inner face to the left-hand outer face of the seal. Commonly, an auxiliary lip 16 is also provided to protect against the entrance of dirt from the outside. As shown in the upper half of FIG. 1, the element 12 is of generally C-shape in cross section and includes a flexible tubular or conical section 18 which joins the lip 14 to the stationary portions of the element which are bonded to the annulus 10. A garter spring 20 (or other type of spring) provides a constricting force substantially in line with the lip 14 and can be retained against displacement by the flange portion 22 or by being seated in an annulus groove, not shown.

A seal of this type, when subjected to either a steady or an intermittent pulse of very high pressure fluid on its inner face, will collapse substantially into the configuration shown at the lower part of FIG. 1. This is caused by the pressure forces acting on the top surface of the section 18 which are unopposed by any significant forces on its under surface. (see the arrows in FIG. 1.) The forces acting on the flange section 22 are substantially balanced. Continued applications of such pressures cause rapid wear and erosion. Under intermittent applications of pressure, the garter spring may move along the inner surface of the element and result in heat and fatigue deterioration of the flexible portion 18 of the element itself. This produces early destruction of the seal in many cases and has been known to occur within a matter of an hour or two from the installation of a new seal.

According to the present invention, these difficulties are overcome by filling the generally toroidal cavity of the seal element with a ring of an elastomeric material bonded to the body of the seal which prevents collapse of the seal under high internal pressure. Such a ring is indicated at 24 in FIG. 2. one preferred material for this purpose is a silicone (or other) rubber adhesive sealant having the properties, before curing, of softness and spreadability to enable its ready application into the toroidal cavity and the ability to cure to a rubber-like consistency with a high degree of adhesion to the element 12. Among the silicone compounds available and suitable for such use is the General Electric Company's Silicone Rubber Adhesive Sealant RTV 108. Besides its adhesive properties when cured, it has a hardness of Shore A 30, a tensil strength of 350 P.S.I. and an elongation of 400%. Typical hardness of the element 12 may be Shore A 70 or within a range of A 50 to A 85.

Other elastomeric materials having similar physical properties may be used including nitriles, polyacrylics, fluorelastomers, and urethanes.

The elastomeric ring 24 can either be bonded to the element 12 by the elastomer being an adhesive sealant or by using a separate bonding method or agent such as a suitable glue or cement. The element 12 is preferably an elastomer but other materials can be used as will be obvious to one skilled in the art, such as leather and polyetrafluoroethylene. When the element 12 is an elastomer, the ring 24 preferably has a hardness substntially less than that of the element 12, such that the ring will not interfere with the flexibility of the seal. In the preferred embodiment the seal body includes both a metal case 10 and the elastomeric element 12 bonded at least to the radially extending part of the metal case 10 and preferably to the entire metal case 10. The ring 24 preferably substantially fills the toroidal space or cavity, i.e. the axially inner face of the ring 24 is preferably located not further, in the axially outward direction, than the plane transverse to the shaft axis and passing through the sealing lip 14. The ring 24 must be bonded to the element 12 (or to both the element 12 and the metal case 10 in those embodiments wherein the element 12 only covers a portion of the inner surface of the metal case 10) to prevent fluid from flowing in between the ring and the element, and is preferably completely bonded to the element 12 at all contacting areas therebetween; however, the ring can be bonded along only the axially extending portions of the element 12 and in fact at a minimum can be bonded only to the axially innermost annular sections of areas 26 and 28 of the element 12 at both of the axially extending portions thereof. In the preferred embodiment shown, the seal is U-shaped; however, other shapes such as the well known V-shaped seals can also be used with the present invention. Thus, the seal body includes a first flexible portion extending axially outwardly from the sealing lip and a second portion that extends radially outwardly and axially inwardly. The second portion can be a single straight element as in a V-shaped seal or two straight elements (one radial and one axial) as in a U-shaped seal. The length of the section 18 in the present invention is preferably at least 0.05 inch and can be much longer to accommodate greater shaft run-out than is possible with prior art high pressure seals, which seals have a very short lip. The ring 24 is preferably formed "in situ" although this is not essential.

Figure 2:
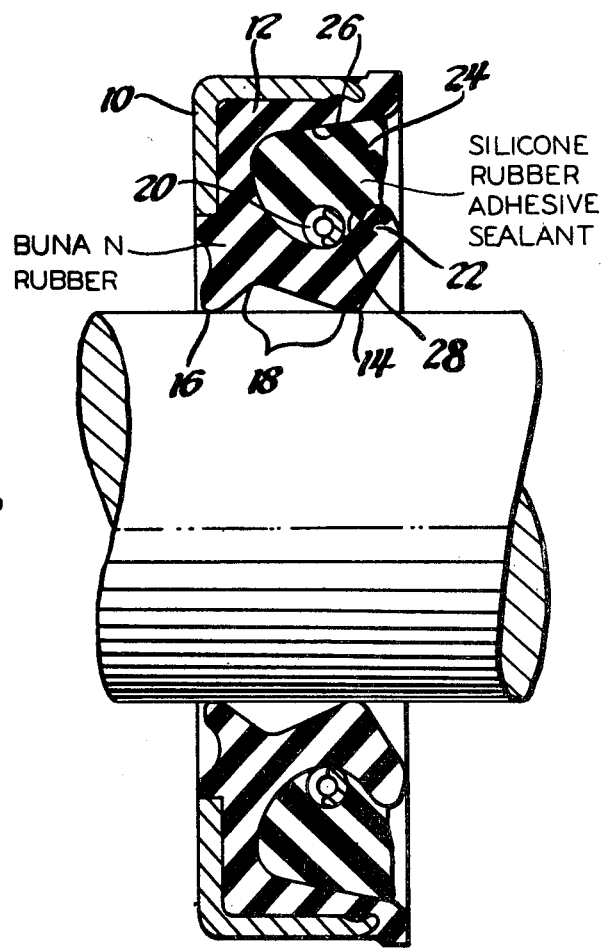
FIG. 2 is a cross sectional view of a shaft seal incorporating a preferred form of the present invention.

As indicated in FIG. 2, the pressure forces can act only on the right face of the ring 24 and of the flange 22. Due to the adhesion between ring 24 and the top and bottom sides of the toroidal cavity, collapse of the section 18 such as shown at the bottom of FIG. 1, is resisted up to pressures as much as 100 times that causing collapse in the comparable conventional seal.

Seals made in this manner have been found to function well in environments such as hydraulic pump housings where subjected to intermittent high pressure pulses and to have a service life comparable to that of a conventional seal in a strictly low pressure housing application. Such conventional seals, however, were unable to withstand the high pressure pulsing service without complete failure in a manner of a very few hours.

I claim:

1. Apparatus comprising in combination a housing having a housing bore therethrough, a shaft extending through said housing bore, and a shaft seal mounted on said housing bore for sealing the space between said shaft and said housing bore said seal comprising a body having a shaft engaging lip in contact with said shaft, the body including a first flexible portion extending from the lip axially outwardly, and a second portion extending thence radially outwardly and axially inwardly to provide between said first and second portions a generally toroidal space, said first portion having a radially inner surface the diameter of which is greater than the inner diameter of said lip such that said inner surface is spaced from and out of contact with said shaft, and a ring of elastomeric material contained in said toroidal space and bonded to the entire surface of said body in contact with said ring, said ring of elastomeric material being in that physical condition such that it does not force said first portion radially inwardly down upon said shaft, and such that said ring exerts a radially outwardly directed holding force on said first portion resisting said inner surface of said first portion from being forced radially inwardly down onto said shaft, when said seal is being used in a high pressure application, and such that said ring does not interfere substantially with the flexibility of said first portion.

2. The seal according to claim 1 wherein at least said first portion of said body is an elastomeric material.

3. The seal according to claim 1 wherein said ring has a hardness less than that of said first portion.

4. The seal according to claim 1 wherein said ring is composed of an elastomeric adhesive sealant material.

5. The seal according to claim 1 wherein said body includes an annular metal case, wherein said first and second portions are made of an elastomeric material, and wherein said second portion is bonded to said metal case.

6. The seal according to claim 5, wherein said elastomeric material is composed of a Buna-N rubber composition and said ring is composed of a silicone rubber composition.

7. The seal according to claim 1 wherein said ring substantially fills said toroidal space.

8. The seal according to claim 7 wherein said body includes an annular metal case and an elastomeric element bonded to said metal case, said elastomeric element including said first portion, wherein said ring has a hardness less than that of said first portion, wherein said ring is bonded to the entire surface of said body in contact with said ring and, wherein said ring is composed of an elastomeric adhesive sealant composition.

9. The seal according to claim 1 including metal spring means surrounding said first portion of said body for exerting a force urging said shaft engaging lip radially inwardly.

10. The seal according to claim 1 wherein said body includes an annular metal case, wherein said first and second portions are made of an elastomeric material, and wherein said second portion is bonded to said metal case.

11. The seal according to claim 10 wherein said elastomeric material is composed of a Buna-N rubber composition and said ring is composed of a silicone rubber composition.

12. The seal according to claim 1, wherein said ring substantially fills said toroidal space.

13. A shaft seal for sealing the space between said shaft and housing bore through which said shaft extends, comprising a body having a shaft engaging lip, the body including a first flexible portion extending from the lip axially outwardly, and a second portion extending thence radially outwardly and axially inwardly to provide between said first and second portions a generally toroidal space, said first portion having a radially inner surface the diameter of which is greater than the inner diameter of said lip such that said inner surface is spaced away from and out of contact with a shaft engaged by said lip when said seal is on-shaft, and a ring of elastomeric material contained in such toroidal space and bonded to the entire surface of said body in contact with said ring, said ring of elastomeric material being in that physical condition such that, when said seal is placed on a shaft for which said seal is designed with said lip in contact with said shaft and with said inner surface spaced away from and out of contact with said shaft, said ring does not force said first portion radially inwardly down upon the shaft, and such that said ring exerts a radially outwardly directed holding force on said first portion resisting said inner surface of said first portion from being forced radially inwardly down onto said shaft when said seal is being used in a high pressure application, and such that said ring does not interfere substantially with the flexibility of said first portion.

14. A shaft seal for sealing the space between a shaft and a housing bore through which said shaft extends, comprising a body having a shaft engaging lip, the body including a first flexible portion extending from the lip axially outwardly, and a second portion extending thence radially outwardly and axially inwardly to provide between said first and second portions a generally toroidal space, said first portion having a radially inner surface the diameter of which is greater than the inner diameter of said lip such that said inner surface is spaced away from and out of contact with a shaft engaged by said lip when the seal is on-shaft, and a ring of elastomeric material contained in said toroidal space and bonded to the entire surface of said body in contact with said ring, said ring of elastomeric material being in that physical condition such that, when said seal is placed on a shaft for which said seal is designed with said lip in contact with said shaft and with said inner surface spaced away from and out of contact with said shaft, said ring does not force said first portion radially inwardly down upon the shaft, and such that said ring exerts a radially outwardly directed holding force on said first portion resisting said inner surface of said first portion from being forced radially inwardly down onto said shaft when said seal is being used in a high pressure application.

* * * * *

UNITED STATES PATENT AND TRADEMARK OFFICE
CERTIFICATE OF CORRECTION

PATENT NO. : 4,141,563
DATED : February 27, 1979
INVENTOR(S) : David H. Wu

It is certified that error appears in the above-identified patent and that said Letters Patent are hereby corrected as shown below:

Delete the title and insert therefor --LIP TYPE SEAL--.

In claim 13, line 2, after "and" insert -- a --.

Signed and Sealed this

Third Day of July 1979

[SEAL]

Attest:

*Attesting Officer*

LUTRELLE F. PARKER
*Acting Commissioner of Patents and Trademarks*